US008570279B2

(12) United States Patent
Ording et al.

(10) Patent No.: US 8,570,279 B2
(45) Date of Patent: Oct. 29, 2013

(54) TOUCH SCREEN DEVICE, METHOD, AND GRAPHICAL USER INTERFACE FOR INSERTING A CHARACTER FROM AN ALTERNATE KEYBOARD

(75) Inventors: Bas Ording, San Francisco, CA (US); Kenneth Kocienda, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 711 days.

(21) Appl. No.: 12/163,886

(22) Filed: Jun. 27, 2008

(65) Prior Publication Data

US 2009/0322688 A1    Dec. 31, 2009

(51) Int. Cl.
*G06F 3/041* (2006.01)
(52) U.S. Cl.
USPC .......................................... 345/173; 345/168
(58) Field of Classification Search
USPC ................................................. 345/173, 168
See application file for complete search history.

(56) References Cited

U.S. PATENT DOCUMENTS

| 5,053,758 | A | 10/1991 | Cornett et al. ................ 340/712 |
| 6,926,609 | B2 | 8/2005 | Martin ............................ 463/36 |
| 7,649,526 | B2 | 1/2010 | Ording et al. |
| 2002/0167545 | A1* | 11/2002 | Kang et al. ..................... 345/780 |
| 2005/0134578 | A1 | 6/2005 | Chambers et al. |
| 2005/0140661 | A1* | 6/2005 | Collins .......................... 345/173 |
| 2008/0098331 | A1 | 4/2008 | Novick et al. |

\* cited by examiner

*Primary Examiner* — Amr Awad
*Assistant Examiner* — Randal Willis
(74) *Attorney, Agent, or Firm* — Morgan, Lewis & Bockius LLP

(57) ABSTRACT

A computer-implemented method for use in conjunction with a computing device with a touch screen display comprises displaying a first soft keyboard. While displaying the first soft keyboard, a key for selecting a second soft keyboard different from the first soft keyboard is displayed. A first contact is detected on the key for selecting the second soft keyboard. In response to detecting the first contact, the second soft keyboard is displayed. Movement of the first contact is detected to a character-insertion key in the second soft keyboard. Lift off of the first contact is detected at the character-insertion key in the second soft keyboard to which the first contact moved. In response to detecting the lift off, a character is inserted that corresponds to the character-insertion key in the second soft keyboard to which the first contact moved and the display of the second soft keyboard is ceased.

25 Claims, 19 Drawing Sheets

TOUCH SCREEN DEVICE, METHOD, AND GRAPHICAL USER INTERFACE FOR INSERTING A CHARACTER FROM AN ALTERNATE KEYBOARD

RELATED APPLICATIONS

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. patent application Ser. No. 11/367,749, "Multi-Functional Hand-Held Device," filed Mar. 3, 2006; and (10) U.S. patent application Ser. No. 11/850,635, "Touch Screen Device, Method, and Graphical User Interface for Determining Commands by Applying Heuristics," filed Sep. 5, 2007. All of these applications are incorporated by reference herein in their entirety.

TECHNICAL FIELD

The disclosed embodiments relate generally to electronic devices with touch screen displays, and more particularly, to electronic devices having a user interface for inserting a character from an alternate keyboard on the touch screen display.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Electronic devices with touch screens may display a variety of different soft keyboards. For example, letter keys may be accessed on one soft keyboard while numbers, punctuation, and other symbols are inserted using another soft keyboard. In conventional user interfaces, accessing two different soft keyboard layouts may be tedious and awkward when a user desires to enter a character from an alternate keyboard.

Accordingly, there is a need for electronic devices with touch screen displays that have more transparent and intuitive user interfaces for using multiple soft keyboards. Such interfaces increase efficiency and user satisfaction with such electronic devices.

SUMMARY

The above deficiencies and other problems associated with user interfaces for devices with touch screen displays are reduced or eliminated by the disclosed multifunction device. In some embodiments, the device is portable. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

In accordance with some embodiments, a computer-implemented method is performed at a portable electronic device with a touch screen display. The computer-implemented method includes displaying a first soft keyboard. The first soft keyboard contains a plurality of character-insertion keys. While displaying the first soft keyboard, a key for selecting a second soft keyboard different from the first soft keyboard is displayed. The second soft keyboard contains a plurality of character-insertion keys. A first contact is detected on the key for selecting the second soft keyboard. In response to detecting the first contact on the key for selecting the second soft keyboard, the second soft keyboard is displayed. The first contact is detected moving on the touch screen display to a character-insertion key in the second soft keyboard. Lift off of the first contact is detected from the touch screen display at the character-insertion key in the second soft keyboard to which the first contact moved. In response to detecting lift off of the first contact from the touch screen display at the character-insertion key in the second soft keyboard to which the first contact moved, a character is inserted that corresponds to the character-insertion key in the second soft keyboard to which the first contact moved and the display of the second soft keyboard is ceased.

In accordance with some embodiments, a graphical user interface on a portable electronic device with a touch screen display includes a first soft keyboard containing a plurality of character-insertion keys; a key for selecting a second soft keyboard different from the first soft keyboard; and the second soft keyboard, the second soft keyboard containing a plurality of character-insertion keys. The key for selecting the second soft keyboard is displayed while displaying the first soft keyboard. In response to detecting a first contact on the key for selecting the second soft keyboard, the second soft keyboard is displayed. The first contact is detected moving on the touch screen display to a character-insertion key in the second soft keyboard. Lift off of the first contact from the touch screen display is detected at the character-insertion key in the second soft keyboard to which the first contact moved. In response to detecting lift off of the first contact from the touch screen display at the character-insertion key in the second soft keyboard to which the first contact moved, a character is inserted that corresponds to the character-insertion key in the second soft keyboard to which the first contact moved and the display of the second soft keyboard is ceased.

In accordance with some embodiments, a portable electronic device includes: a touch screen display; one or more processors; memory; and one or more programs. The one or more programs are stored in the memory and configured to be executed by the one or more processors. The one or more programs include instructions for: displaying a first soft keyboard, the first soft keyboard containing a plurality of character-insertion keys; while displaying the first soft keyboard, displaying a key for selecting a second soft keyboard different from the first soft keyboard, the second soft keyboard containing a plurality of character-insertion keys; detecting a first contact on the key for selecting the second soft keyboard; in response to detecting the first contact on the key for selecting the second soft keyboard, displaying the second soft keyboard; detecting the first contact moving on the touch screen display to a character-insertion key in the second soft keyboard; detecting lift off of the first contact from the touch screen display at the character-insertion key in the second soft keyboard to which the first contact moved; and in response to detecting lift off of the first contact from the touch screen display at the character-insertion key in the second soft keyboard to which the first contact moved, inserting a character that corresponds to the character-insertion key in the second soft keyboard to which the first contact moved and ceasing to display the second soft keyboard.

In accordance with some embodiments, a computer readable storage medium has stored therein instructions, which when executed by a portable electronic device with a touch screen display, cause the portable electronic device to: display a first soft keyboard, the first soft keyboard containing a plurality of character-insertion keys; while displaying the first soft keyboard, display a key for selecting a second soft keyboard different from the first soft keyboard, the second soft keyboard containing a plurality of character-insertion keys; detect a first contact on the key for selecting the second soft keyboard; in response to detecting the first contact on the key for selecting the second soft keyboard, display the second soft keyboard; detect the first contact moving on the touch screen display to a character-insertion key in the second soft keyboard; detect lift off of the first contact from the touch screen display at the character-insertion key in the second soft keyboard to which the first contact moved; and in response to detecting lift off of the first contact from the touch screen display at the character-insertion key in the second soft keyboard to which the first contact moved, insert a character that corresponds to the character-insertion key in the second soft keyboard to which the first contact moved and cease to display the second soft keyboard.

In accordance with some embodiments, a portable electronic device includes: a touch screen display; means for displaying a first soft keyboard, the first soft keyboard containing a plurality of character-insertion keys; while displaying the first soft keyboard, means for displaying a key for selecting a second soft keyboard different from the first soft keyboard, the second soft keyboard containing a plurality of character-insertion keys; means for detecting a first contact on the key for selecting the second soft keyboard; in response to detecting the first contact on the key for selecting the second soft keyboard, means for displaying the second soft keyboard; means for detecting the first contact moving on the touch screen display to a character-insertion key in the second soft keyboard; means for detecting lift off of the first contact from the touch screen display at the character-insertion key in the second soft keyboard to which the first contact moved; and in response to detecting lift off of the first contact from the touch screen display at the character-insertion key in the second soft keyboard to which the first contact moved, means for inserting a character that corresponds to the character-insertion key in the second soft keyboard to which the first contact moved and means for ceasing to display the second soft keyboard.

Thus, the invention provides a simple, efficient, and easy-to-use interface for inserting a character from an alternate keyboard on an electronic device with a touch screen display.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
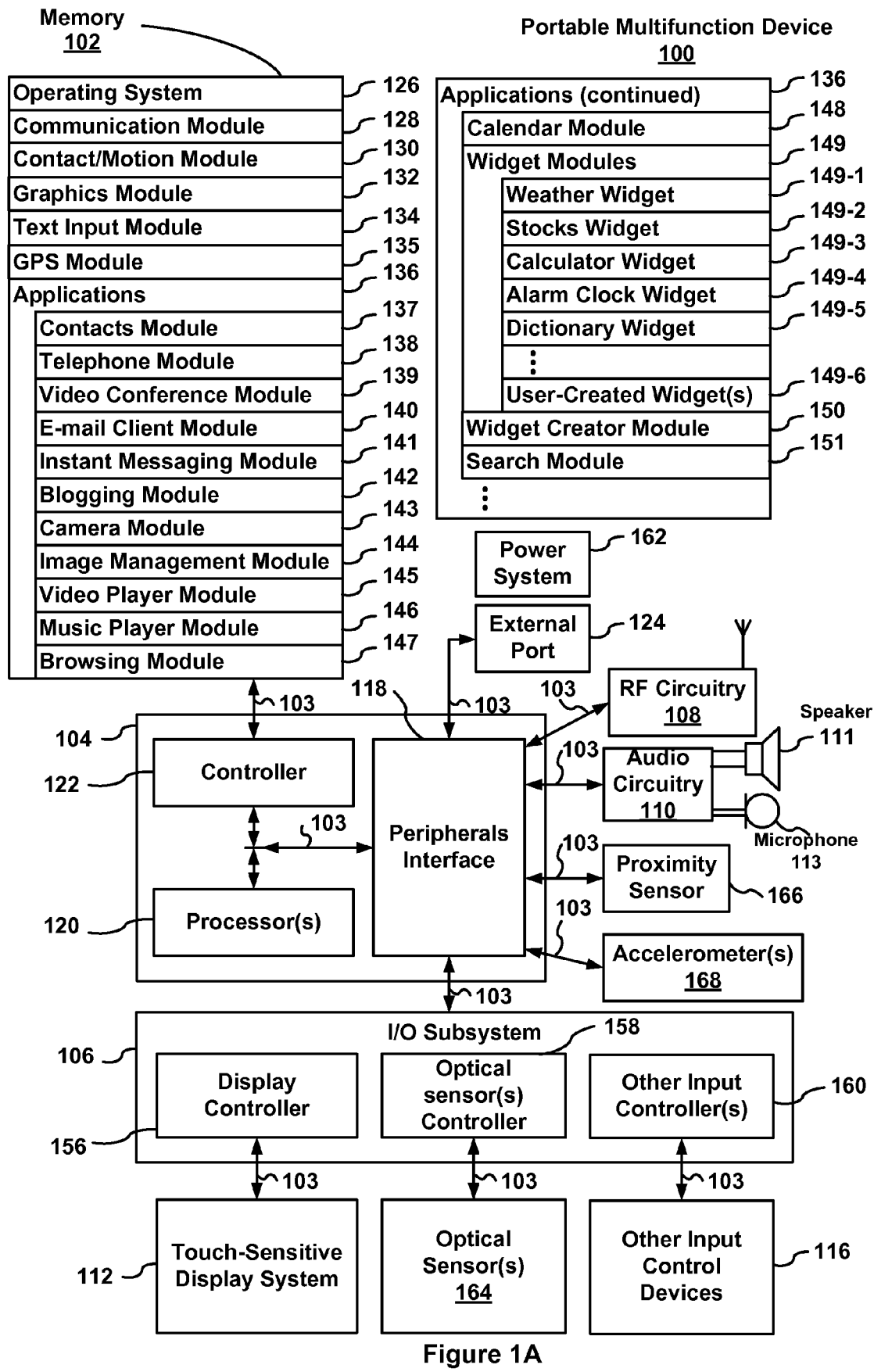
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as one or more of the following: a telephone application, a video conferencing application, an e-mail application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent applications Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
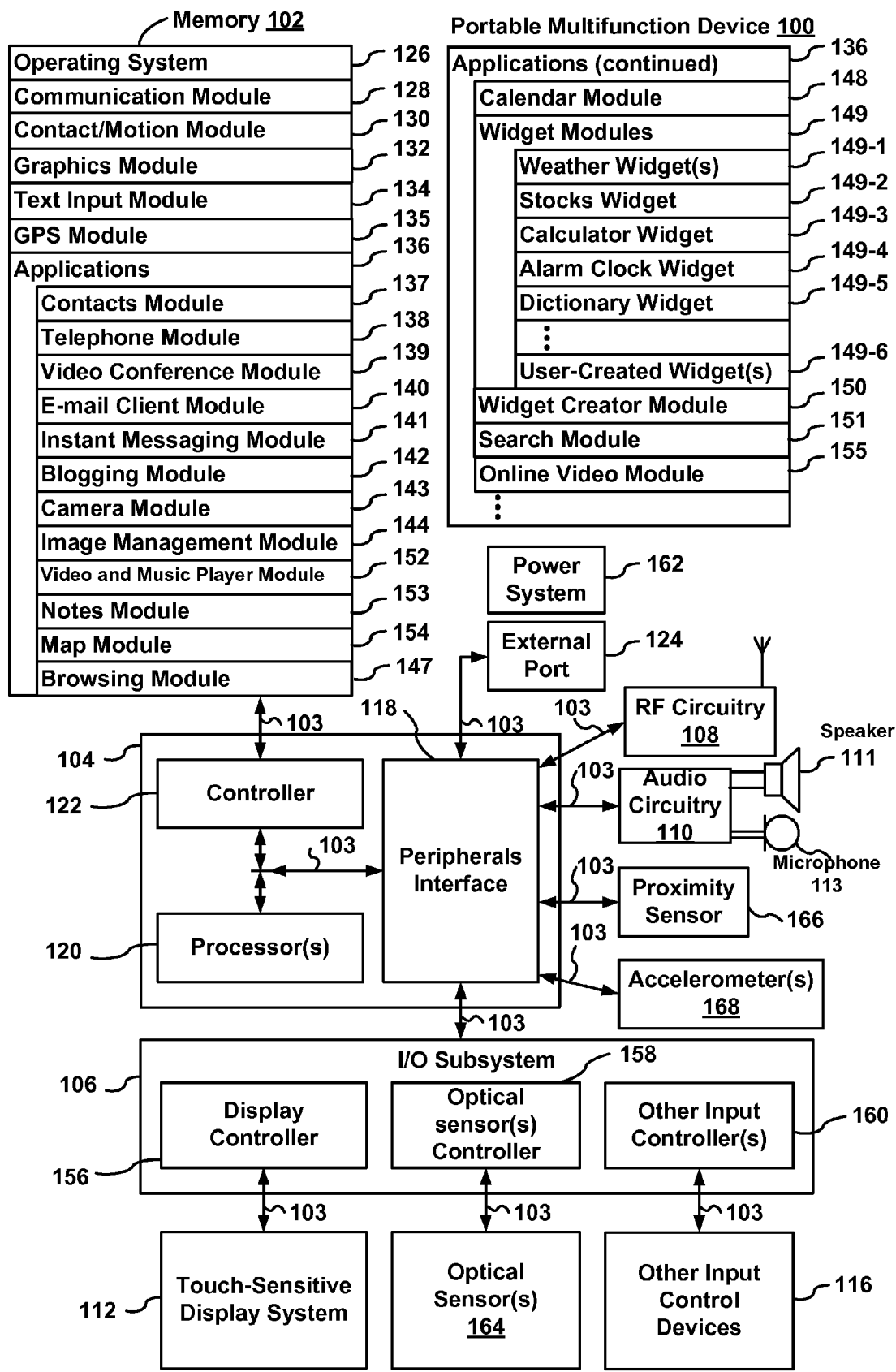

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S.

patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
  a contacts module 137 (sometimes called an address book or contact list);
  a telephone module 138;
  a video conferencing module 139;
  an e-mail client module 140;
  an instant messaging (IM) module 141;
  a blogging module 142;
  a camera module 143 for still and/or video images;
  an image management module 144;
  a video player module 145;
  a music player module 146;
  a browser module 147;
  a calendar module 148;
  widget modules 149, which may include weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file.

In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
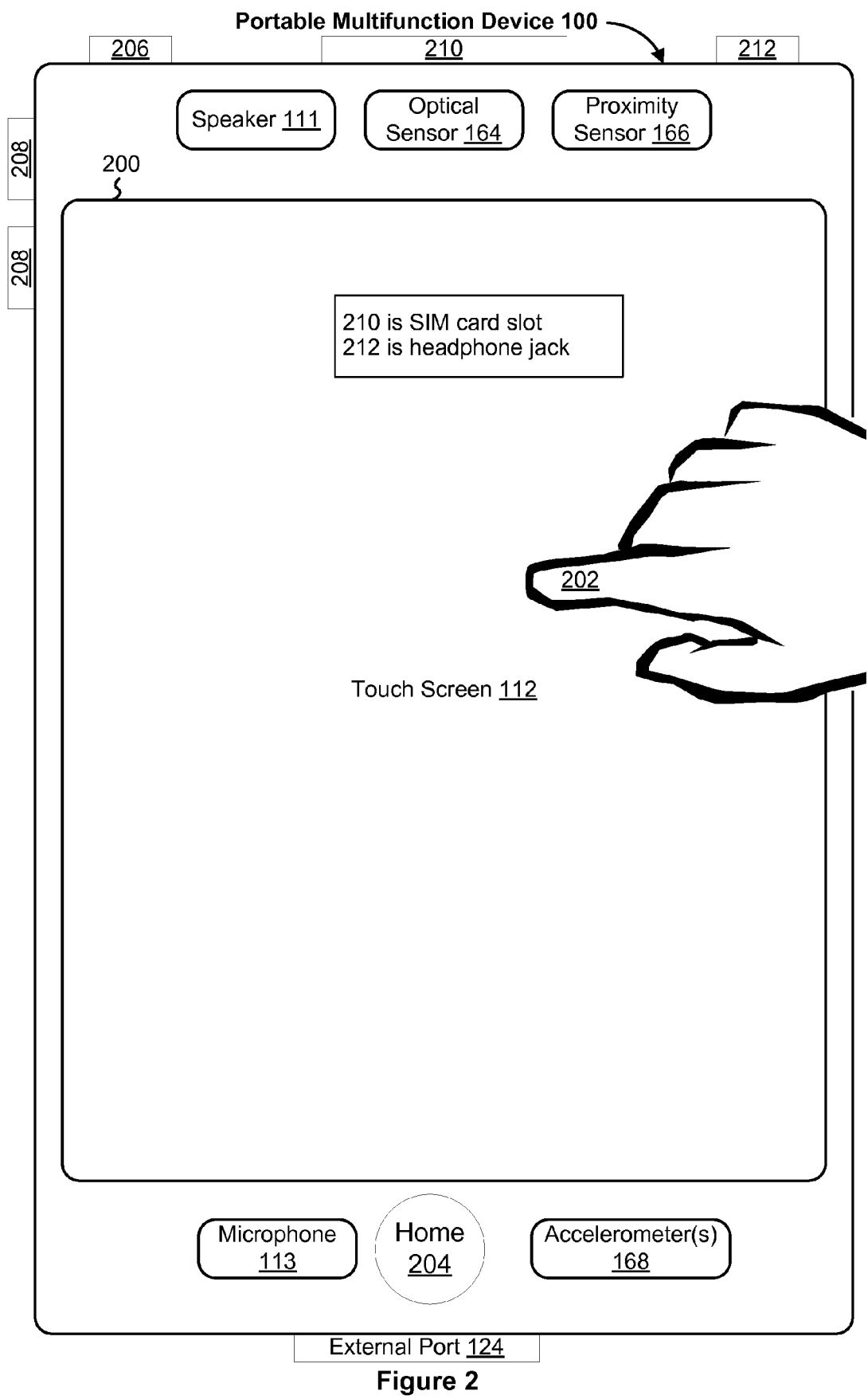
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3A:
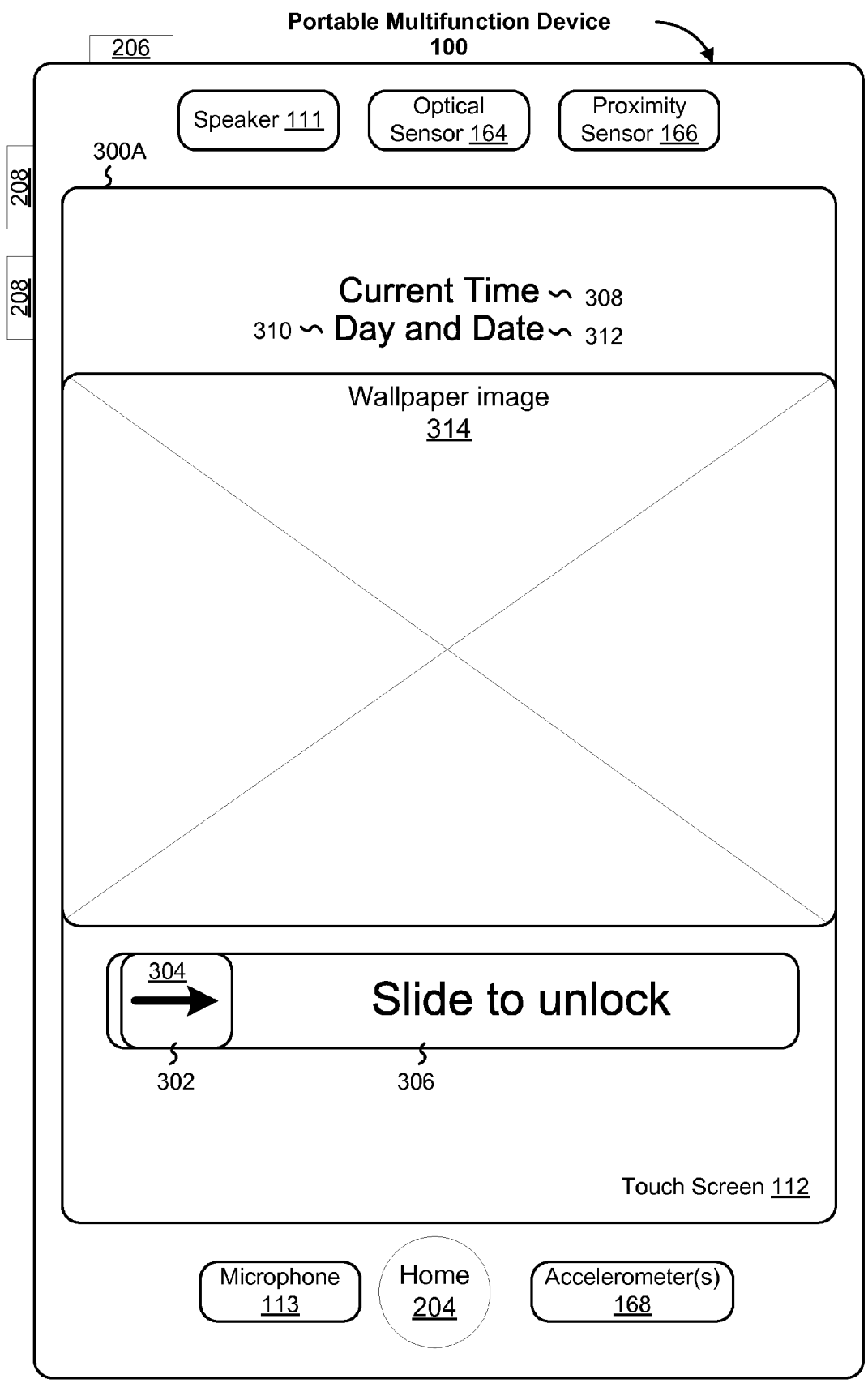
FIGS. 3A-3C illustrate exemplary user interfaces for unlocking a portable electronic device in accordance with some embodiments.
Figure 3B:
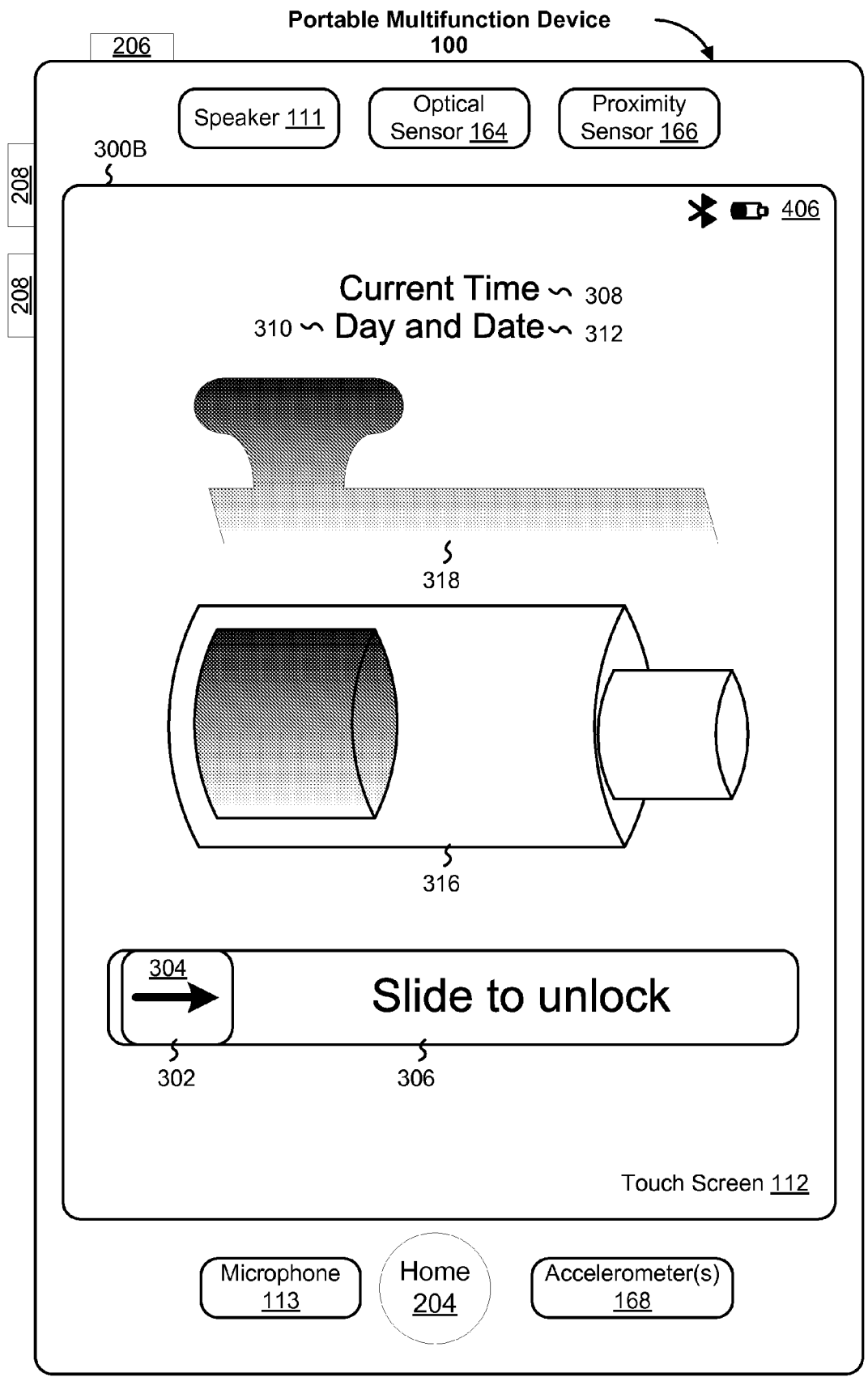
Figure 3C:
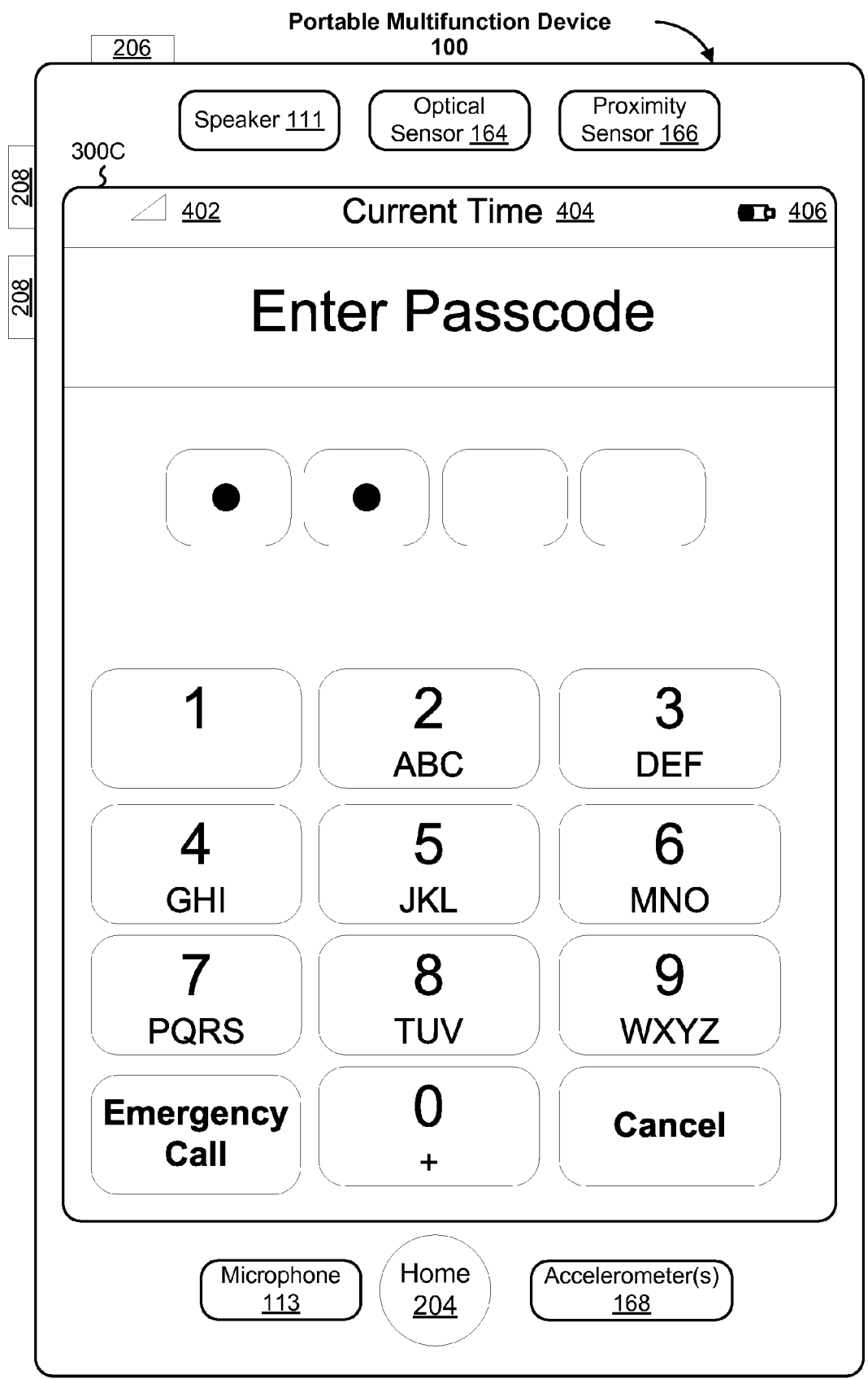

FIGS. 3A-3C illustrate exemplary user interfaces for unlocking a portable electronic device in accordance with some embodiments. In some embodiments, user interface 300A includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, in addition to or in place of wallpaper image 314, an unlock user interface may include a device charging status icon 316 and a headset charging status icon 318 (e.g., UI 300B, FIG. 3B). The device charging status icon 316 indicates the battery status while the device 100 is being recharged (e.g., in a dock). Similarly, headset charging status icon 318 indicates the battery status of a headset associated with device 100 (e.g., a Bluetooth headset) while the headset is being recharged (e.g., in another portion of the dock).

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. This process saves battery power by ensuring that the device is not accidentally awakened. This process is easy for users to perform, in part because of the visual cue(s) provided on the touch screen.

In some embodiments, after detecting an unlock gesture, the device displays a passcode (or password) interface (e.g., UI 300C, FIG. 3C) for entering a passcode to complete the unlock process. The addition of a passcode protects against unauthorized use of the device. In some embodiments, the passcode interface includes an emergency call icon that permits an emergency call (e.g., to 911) without entering the passcode. In some embodiments, the use of a passcode is a user-selectable option (e.g., part of settings 412).

As noted above, processes that use gestures on the touch screen to unlock the device are described in U.S. patent applications Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Figure 4A:
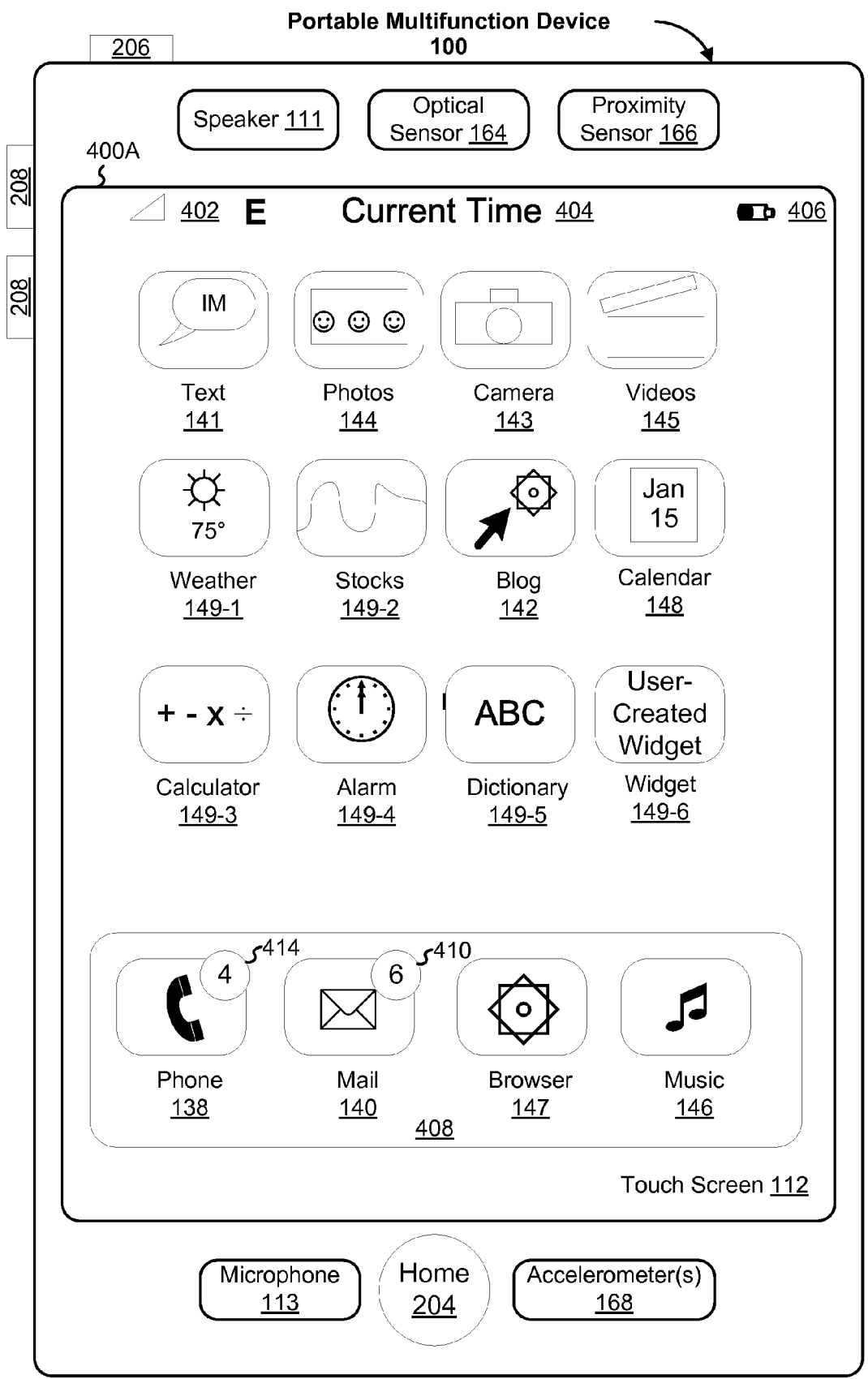
FIGS. 4A and 4B illustrate exemplary user interfaces for a menu of applications on a portable multifunction device in accordance with some embodiments.
Figure 4B:
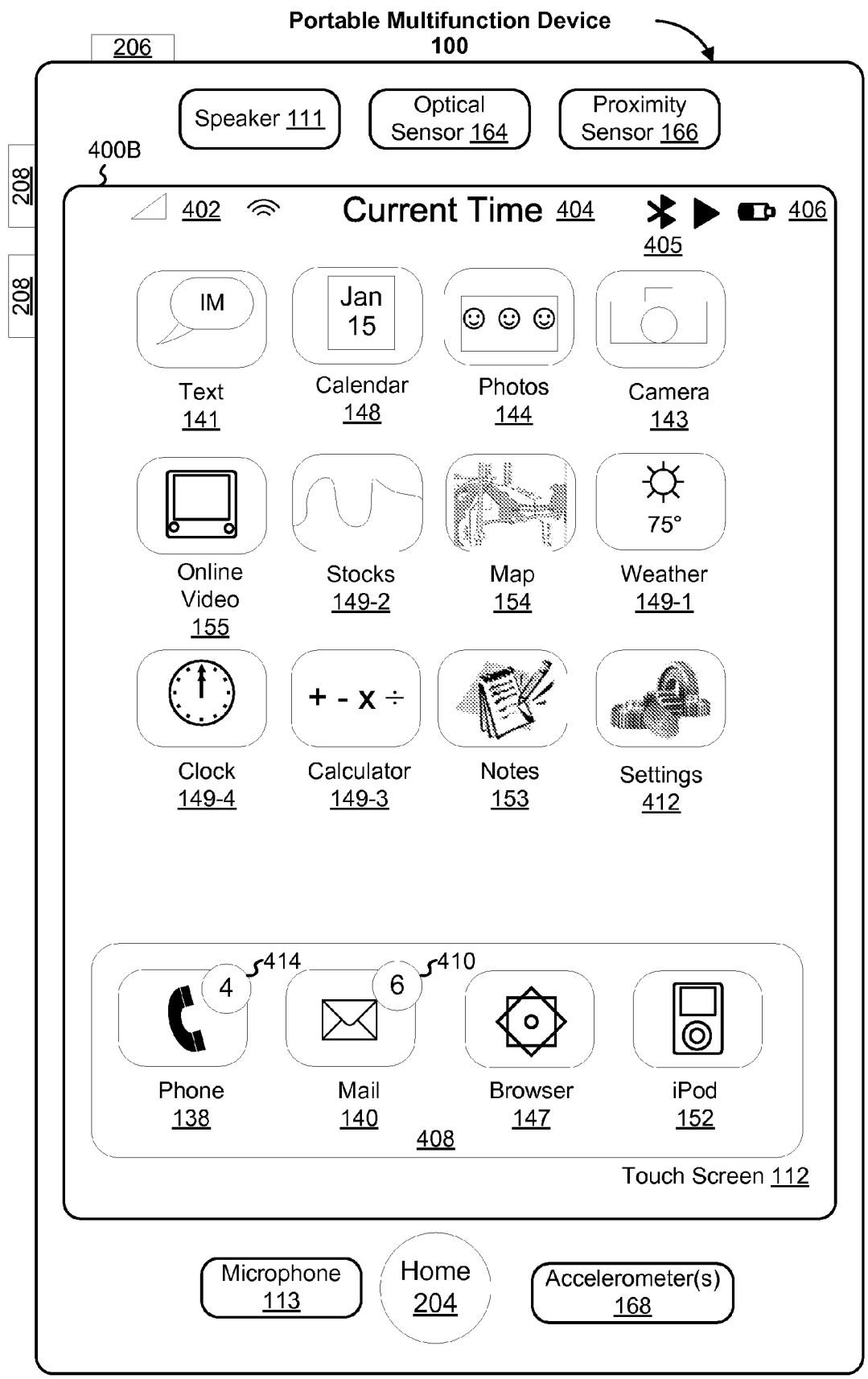

FIGS. 4A and 4B illustrate exemplary user interfaces for a menu of applications on a portable multifunction device in accordance with some embodiments. In some embodiments, user interface 400A includes the following elements, or a subset or superset thereof:

Signal strength indicator(s) 402 for wireless communication(s), such as cellular and Wi-Fi signals;
Time 404;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Blog 142;
  Calendar 148;
  Calculator 149-3;

Alarm clock 149-4;
Dictionary 149-5; and
User-created widget 149-6.

In some embodiments, user interface 400B includes the following elements, or a subset or superset thereof:
- 402, 404, 406, 141, 148, 144, 143, 149-3, 149-2, 149-1, 149-4, 410, 414, 138, 140, and 147, as described above;
- Bluetooth indicator 405;
- Map 154;
- Notes 153;
- Settings 412, which provides access to settings for the device 100 and its various applications 136, as described further below;
- Video and music player module 152, also referred to as iPod (trademark of Apple Computer, Inc.) module 152; and
- Online video module 155, also referred to as YouTube (trademark of Google, Inc.) module 155.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application). In some embodiments, a predefined gesture on the menu button 204 (e.g., a double tap or a double click) acts as a short cut that initiates display of a particular user interface in a particular application. In some embodiments, the short cut is a user-selectable option (e.g., part of settings 412). For example, if the user makes frequent calls to persons listed in a Favorites UI (e.g., UI 2700A, FIG. 27A) in the phone 138, the user may choose to have the Favorites UI be displayed in response to a double click on the menu button. As another example, the user may choose to have a UI with information about the currently playing music (e.g., UI 4300S, FIG. 43S) be displayed in response to a double click on the menu button.

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

In some embodiments, a signal strength indicator 402 (FIG. 4B) for a WiFi network is replaced by a symbol for a cellular network (e.g., the letter "E" for an EDGE network, FIG. 4A) when the device switches from using the WiFi network to using the cellular network for data transmission (e.g., because the WiFi signal is weak or unavailable).

Figure 5A:
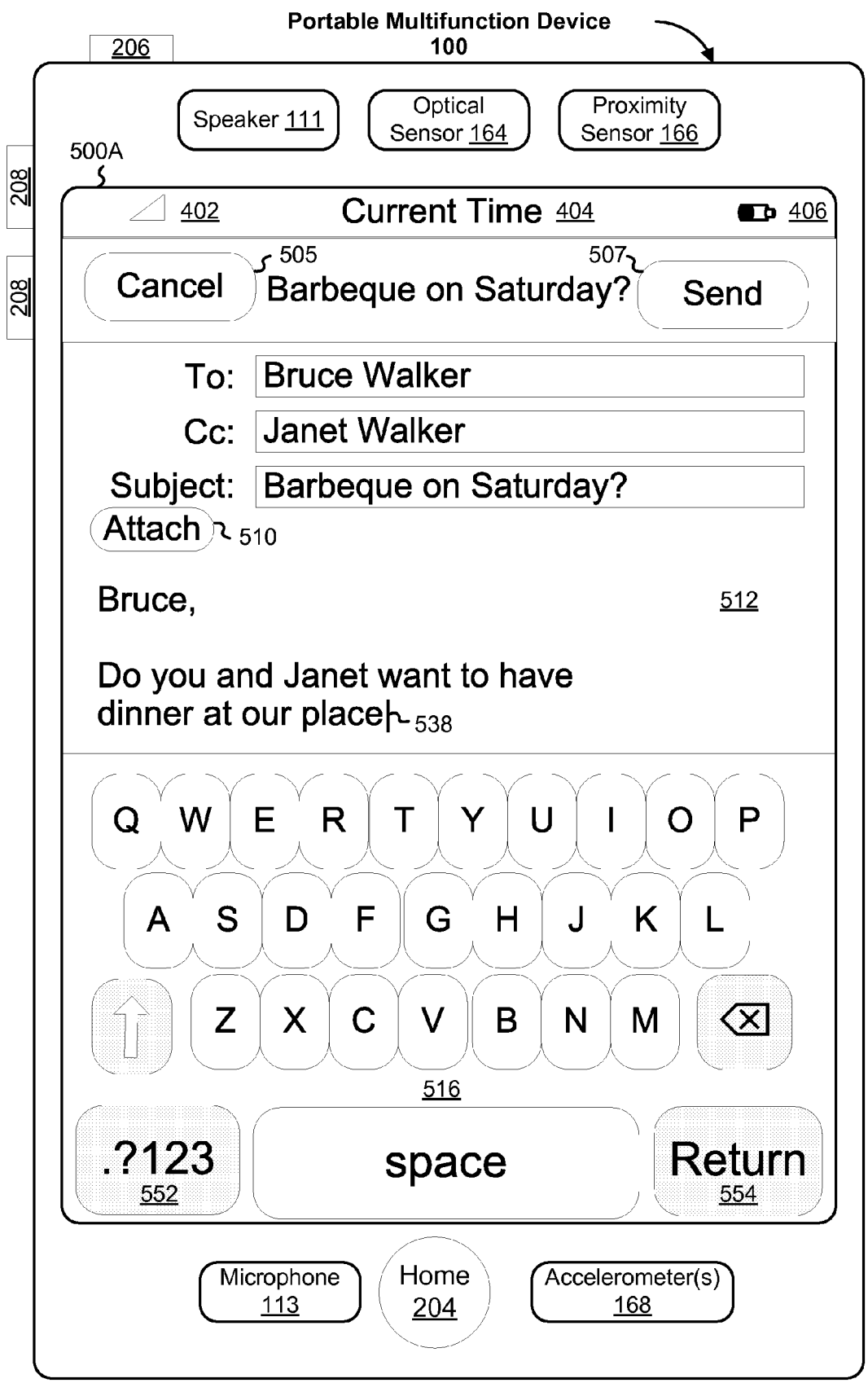
FIGS. 5A-5H illustrate exemplary user interfaces for inserting a character from an alternate keyboard on a touch screen display in accordance with some embodiments.

FIGS. 5A-5H illustrate exemplary user interfaces for inserting a character from an alternate keyboard on a touch screen in accordance with some embodiments. FIG. 5A, for example, includes a UI 500A for creating and sending an email message (e.g., "Barbeque on Saturday" shown in UIs 500A-H, FIGS. 5A-5H).

In some embodiments, UIs 500A-H (FIGS. 5A-5H) include the following elements, or a subset or superset thereof:
- 402, 404, and 406, as described above;
- Cancel icon 505 that when activated (e.g., by a finger tap on the icon) cancels the message being composed;
- Send icon 507 that when activated (e.g., by a finger tap on the icon) initiates sending the message to one or more parties (e.g., Bruce Walker, Janet Walker);
- Attach icon 510 that when activated (e.g., by a finger tap on the icon), displays a UI for adding attachments (not shown).
- Message box 512;
- Letter keyboard 516 for entering text (e.g. in box 512), which contains a plurality of character-insertion keys (e.g., letter keys A-Z and the space bar);
- Number/symbol keyboard 518 for entering text (e.g., in box 512), which contains a plurality of character-insertion keys (e.g., number keys 0-9, space bar, and symbol keys);
- Insertion marker 538 (e.g., a cursor, insertion bar, insertion point, or pointer) that indicates where the next character will be inserted;
- Alternate keyboard selector key 552 that when activated (e.g., by a finger contact or tap on the icon) initiates the display of a different keyboard (e.g., number/symbol keyboard 518, FIG. 5C);
- Return icon 554 that when activated (e.g., by a finger tap on the icon) initiates a return such that the insertion marker 538 starts a new line of text (not shown); and
- Alternate keyboard selector key 556 that when activated (e.g., by a finger contact or tap on the icon) initiates the display of a different keyboard (e.g., letter keyboard 516, FIG. 5A).

In some embodiments, a first keyboard (e.g., letter keyboard 516) is displayed that contains a plurality of character-insertion keys (e.g., letter keys A-Z and the space bar on the letter keyboard 516). In some embodiments, while displaying the letter keyboard 516, a contact 560-1 is detected on the alternate keyboard selector key 552 (UI 500B, FIG. 5B). In response to detecting the contact 560-1 (FIG. 5B) on the alternate keyboard selector key 552, a second soft keyboard (e.g. number/symbol keyboard 518) is displayed (UI 500C, FIG. 5C).

In some embodiments, the second soft keyboard contains a plurality of number and/or symbol insertion keys (e.g., number keys 0-9, space bar and symbol keys on the number/symbol keyboard 518) and includes another alternate keyboard selector key 556. In some embodiments, the character-insertion keys in the number/symbol keyboard 518 (FIG. 5C) and the other keyboards are visually distinguished from keys that do not insert characters. For example, character-insertion keys for letters, numbers, punctuation marks, a space, or other symbols may have a different shading or color than keys in the second keyboard that do not insert characters such as a deletion key, a return key, a shift key, or a key for selecting another soft keyboard. In user interfaces 500A-500H (FIGS. 5A-5H), the keys that do not insert characters are shaded slightly darker than the keys used to insert characters.

In some embodiments, the contact 560 is a finger contact. In some embodiments, the contact 560 is a stylus contact.

In some embodiments, displaying the number/symbol keyboard 518 (FIG. 5C) in response to detecting the contact 560 (FIG. 5B) on the alternate keyboard selector key 552 (FIG. 5B) includes ceasing to display the letter keyboard 516 (first displayed in FIG. 5A).

Figure 5B:
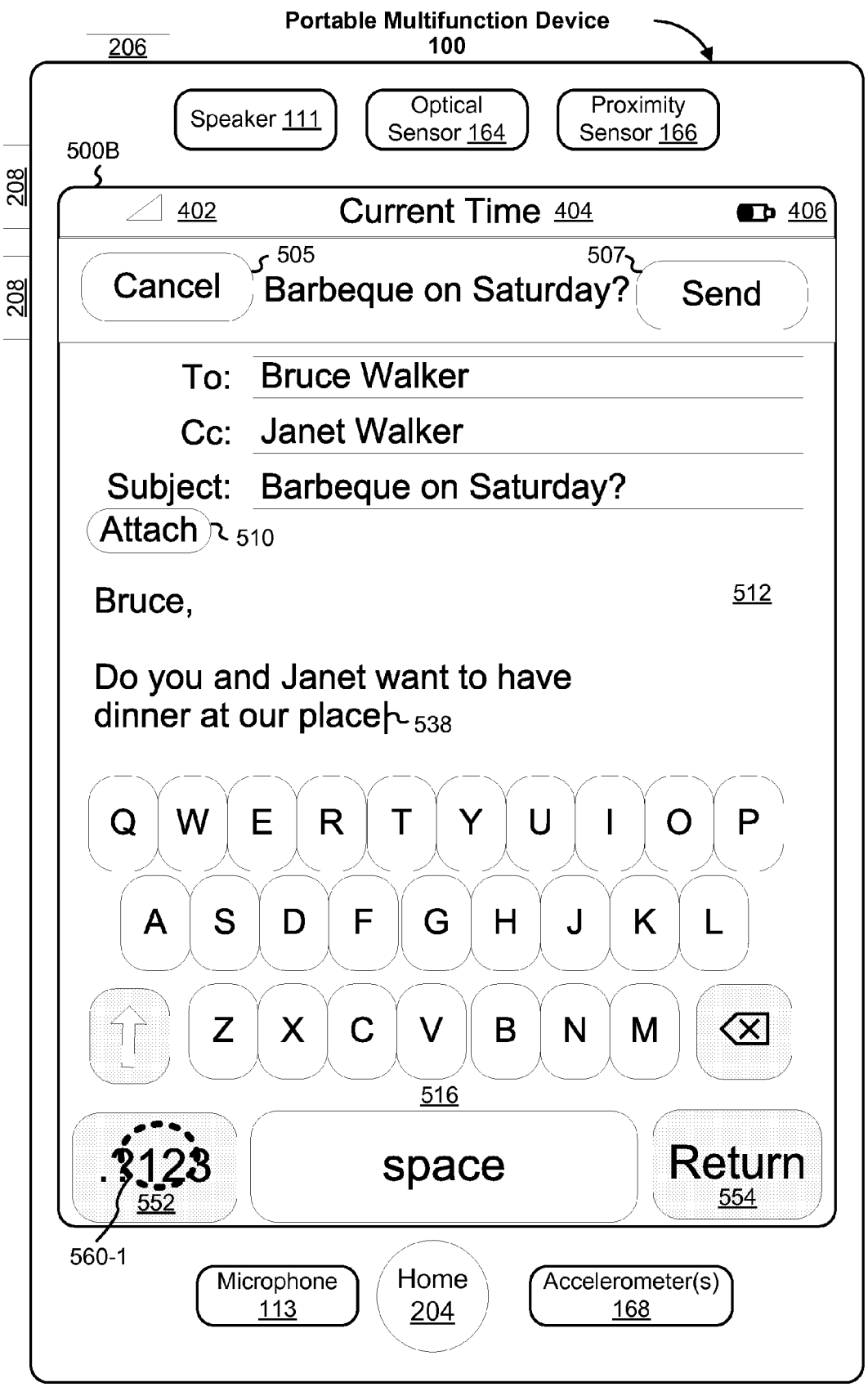
Figure 5C:
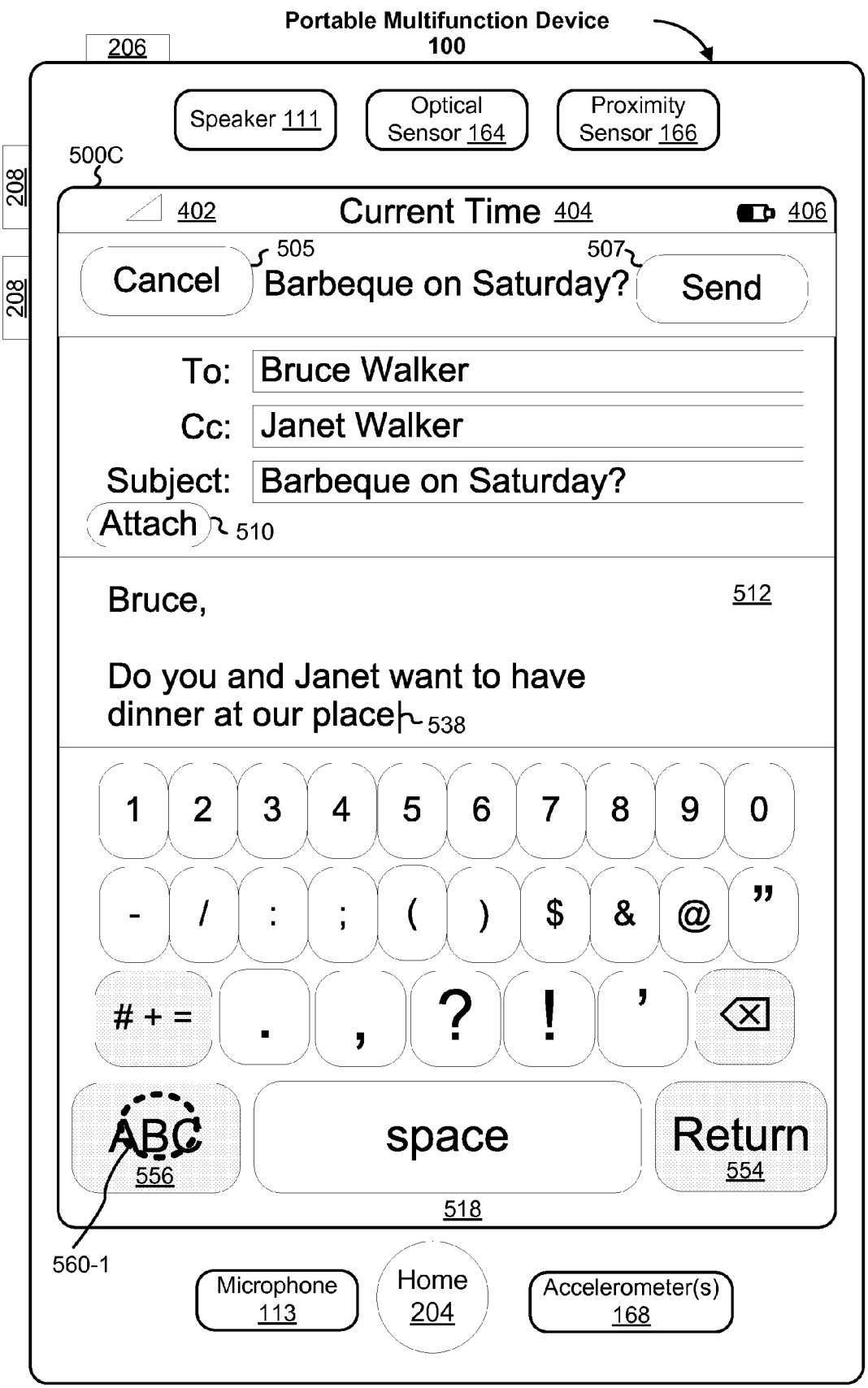
Figure 5D:
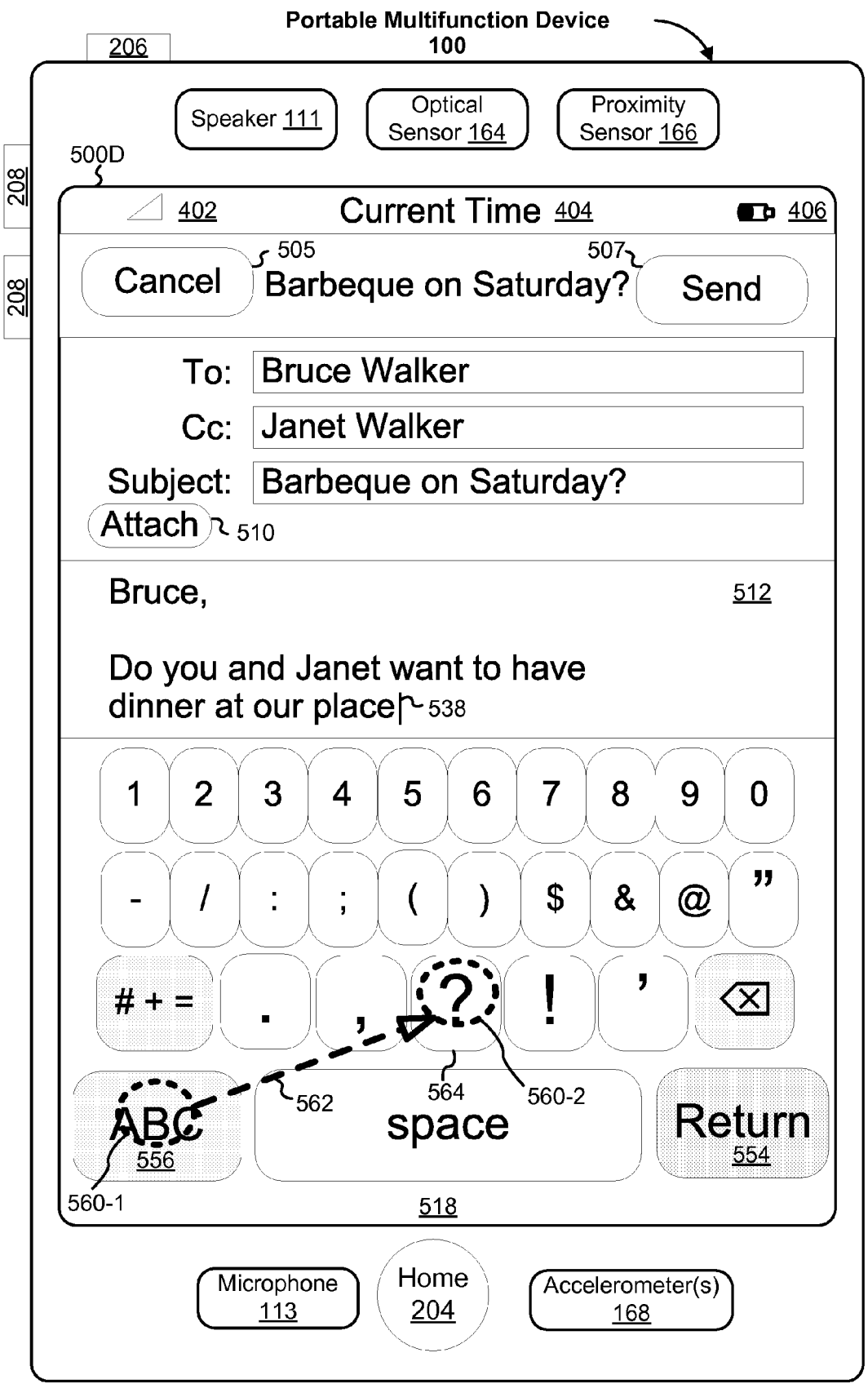
Figure 5E:
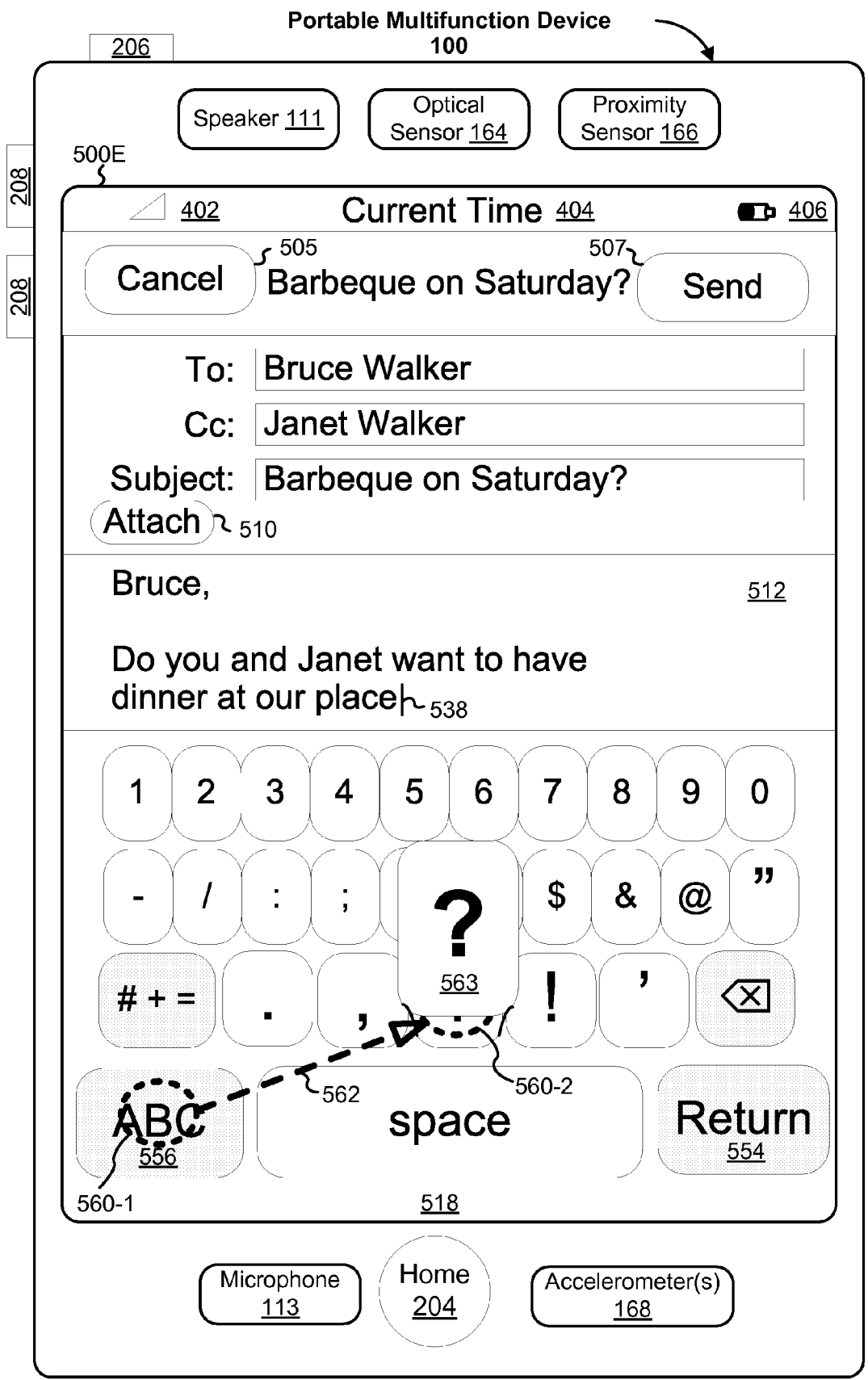

In some embodiments, in response to detecting a contact (e.g., contact 560-2, FIG. 5D) over a character-insertion key (e.g., "?" key 564, FIG. 5D), an image with an enlarged version of the character in the character-insertion key is displayed (e.g., image 563 with an enlarged version of the "?" character in key 564, FIG. 5E) to indicate that the corresponding character-insertion key (e.g., 564) will be selected if the contact 560 lifts off at its current position. In some embodiments, in response to detecting a contact (e.g., contact 560-2, FIG. 5D) over a character-insertion key (e.g., "?" key 564, FIG. 5D), an enlarged version of the character-insertion key is displayed to indicate that the character-insertion key will be selected if the contact 560 lifts off at its current position. In some embodiments, if lift off of the contact 560-2 is detected at a character-insertion key, the corresponding character 574 is inserted at the insertion marker 538 (FIG. 5F) and the number/symbol keyboard 518 ceases to be displayed (UI 500F, FIG. 5F). In some embodiments, the letter keyboard 516 (the first keyboard to be displayed) is redisplayed (UI 500F, FIG. 5F) when the number/symbol keyboard 518 ceases to be displayed.

In some embodiments, if the contact 560-1 (FIG. 5G) is moved (e.g., movements 571 and 575) to keys that do not insert characters (e.g., keys that are shaded on keyboard 518 in UI 500G, FIG. 5G), and lift off is detected over such keys (e.g., contacts 560-4, 560-5, FIG. 5G), then the display of the alternate keyboard (e.g., number/symbol keyboard 518 in UI 500H, FIG. 5H) is maintained. In some embodiments, the display of the alternate keyboard (e.g., number/symbol keyboard 518 in UI 500H, FIG. 5H) is maintained if lift off is detected in regions of the touch screen display other than keys for inserting characters. For example, if the contact 560 is moved as shown by movement 565 from 560-1 to 560-3 and lift off is detected at 560-3, the number/symbol keyboard is maintained (UI 500H, FIG. 5H).

The user interfaces in FIGS. 5A-5H are used to illustrate the process described below with respect to FIGS. 6A-6C.

Figure 6A:
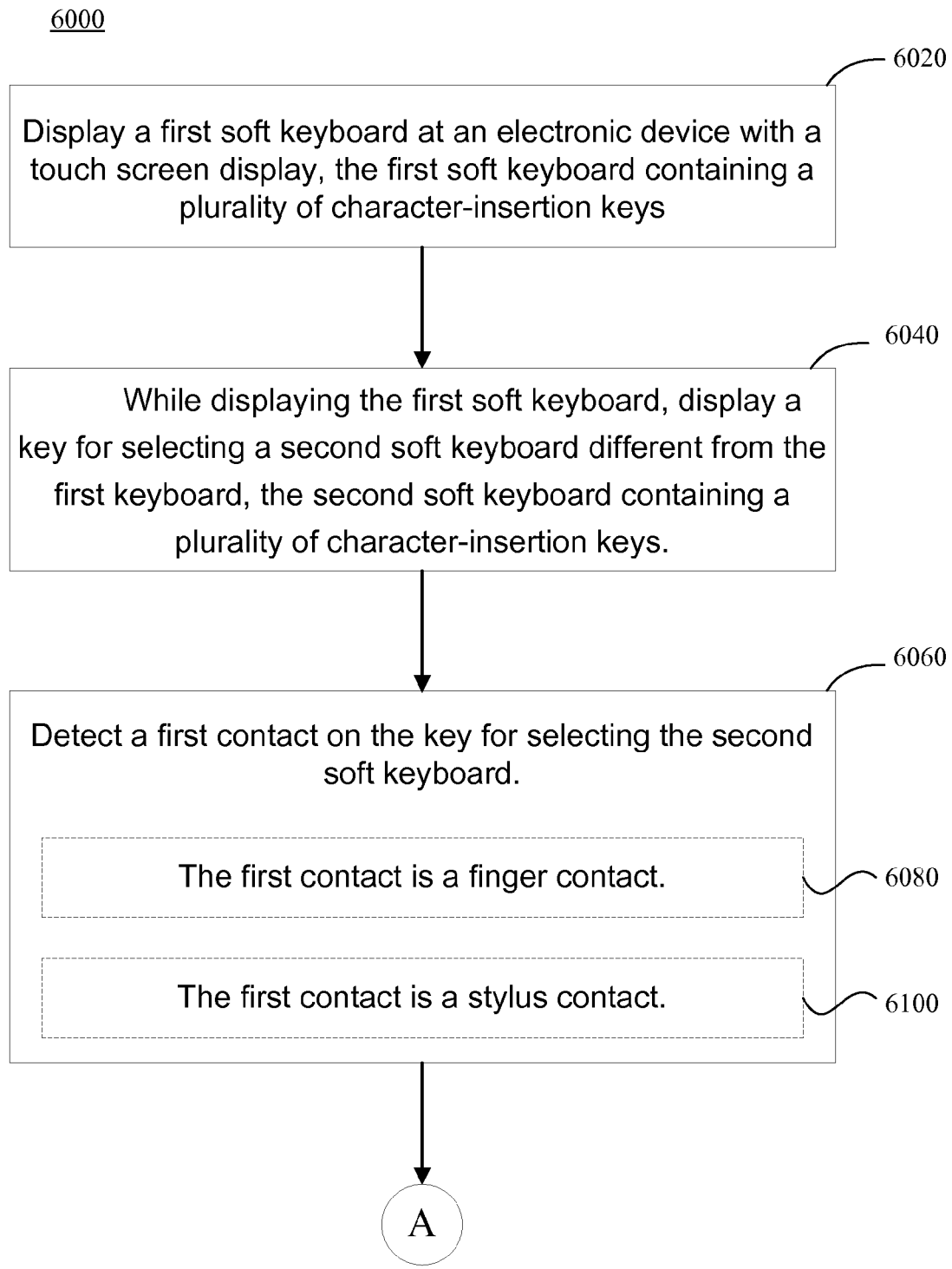
FIGS. 6A-C is a flow diagram illustrating a method of inserting a character from an alternate keyboard on a touch screen display in accordance with some embodiments.

FIG. 6A is flow diagram illustrating a method 6000 of inserting a character from an alternate keyboard on a touch screen display in accordance with some embodiments. The method 6000 is performed at a device with a touch screen display. In some embodiments, the method 6000 is performed at a portable multifunction device with a touch screen display (e.g., portable multifunction device 100). As described below, the method 6000 provides an efficient way for a user to insert a character from an alternate keyboard.

The device displays (6020) a first soft keyboard. The first soft keyboard contains a plurality of character-insertion keys (e.g., keyboard 516 with keys A-Z and space bar, FIG. 5A).

While displaying the first soft keyboard, the device displays (6040) a key for selecting a second soft keyboard different from the first soft keyboard (e.g., key 552, FIG. 5A). The second soft keyboard contains a plurality of character-insertion keys (e.g., keyboard 518 with number keys, space bar, and symbol keys, FIG. 5C).

The device detects (6060) a first contact 560 on the key for selecting the second soft keyboard (e.g., contact 560-1 on key 552, FIG. 5B).

In some embodiments, the first contact 560 is a finger contact (6080). In some embodiments, the first contact 560 is a stylus contact (6100).

In response to detecting the first contact 560 on the key for selecting the second soft keyboard, the device displays (6120) the second soft keyboard (e.g., keyboard 518, FIG. 5C).

In some embodiments, the character-insertion keys in the second keyboard are (6140) visually distinguished from keys in the second keyboard that do not insert characters. For example, character-insertion keys for letters, numbers, punctuation marks, a space, or other symbols may have a different shading or color than keys in the second keyboard that do not insert characters such as a deletion key, a return key, a shift key, or a key for selecting another soft keyboard. In user interfaces 500A-500H (FIGS. 5A-5H), the keys that do not insert characters are shaded slightly darker than the keys used to insert characters.

In some embodiments, displaying the second soft keyboard in response to detecting the first contact 560 on the key for selecting the second soft keyboard includes (6160) ceasing to display the first soft keyboard. For example, in response to detecting contact 560-1 on key 552 (FIG. 5B), the device displays keyboard 518 and ceases to display keyboard 516 (FIG. 5C). Conversely, in some embodiments, all or part of the first keyboard is still displayed (e.g., on devices with large touch screens, not shown).

The device detects (6180) the first contact 560 moving on the touch screen display to a character-insertion key in the second soft keyboard. For example, the device detects contact 560 (FIG. 5D) moving 562 from key 556 to character-insertion key 564 (FIG. 5D), a "?" key.

The device detects (6200) lift off of the first contact 560 from the touch screen display at the character-insertion key in the second soft keyboard to which the first contact moved. For example, the device detects lift off of the first contact 560 at the "?" key 564 (FIG. 5D or 5E).

First contact 560 is a continuous contact with the touch screen display. In other words, the first contact 560 maintains contact with the touch screen display from the time the first contact (e.g., 560-1) is detected on the key for selecting the second soft keyboard until the time that lift off of the first contact (e.g., 560-2) from the touch screen display is detected at the character-insertion key in the second soft keyboard to which the first contact moved.

Figure 5F:
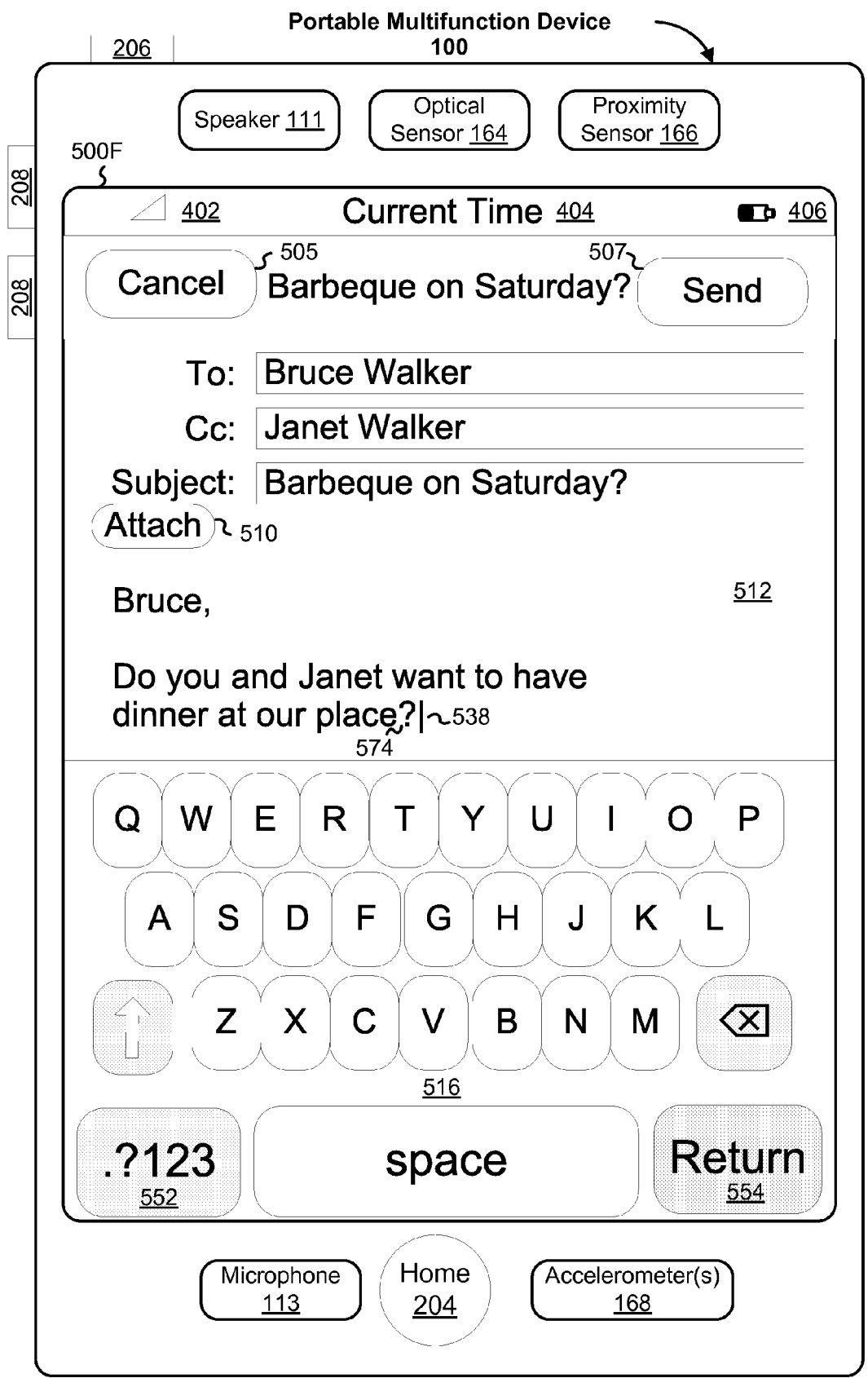
Figure 5G:
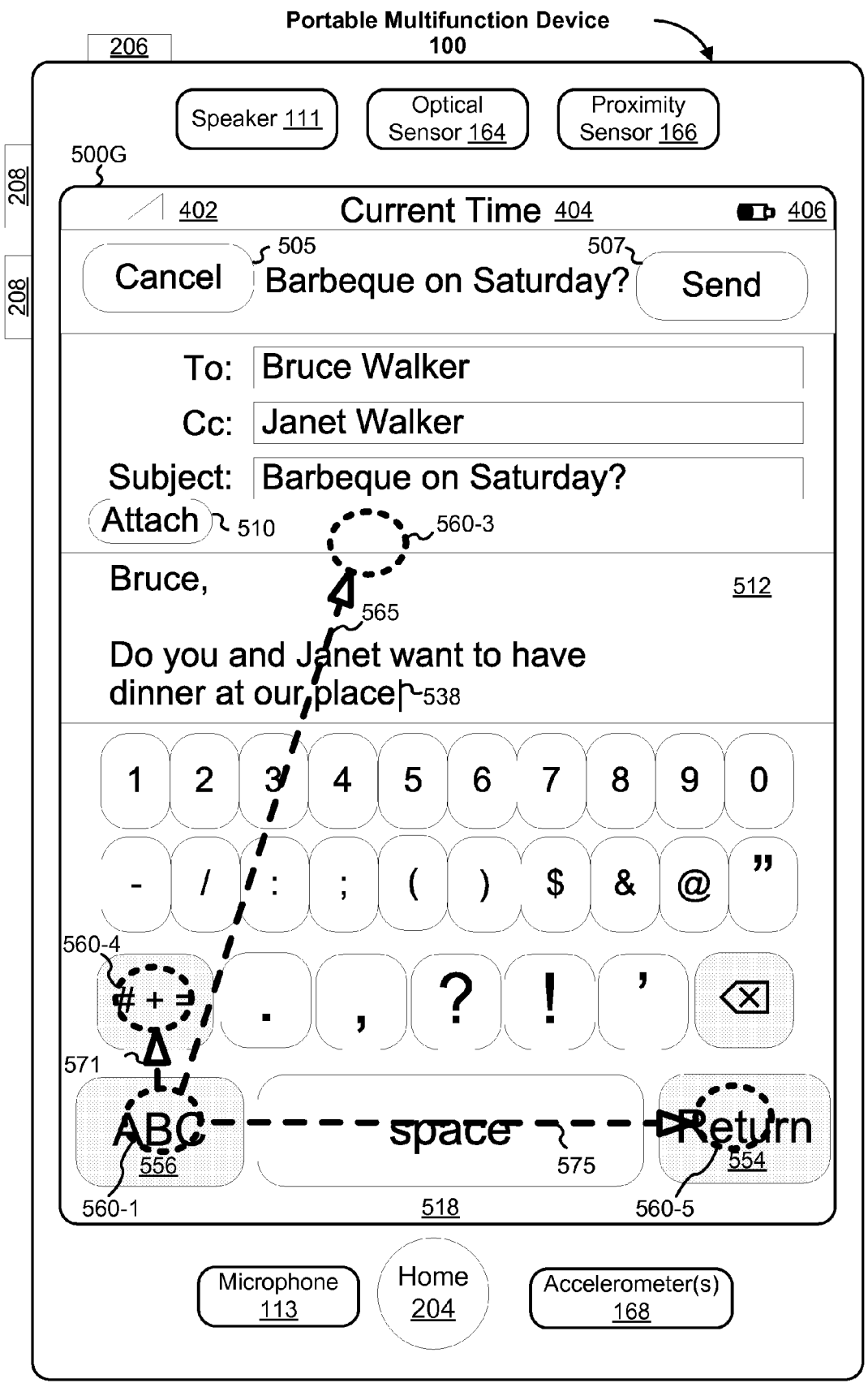
Figure 5H:
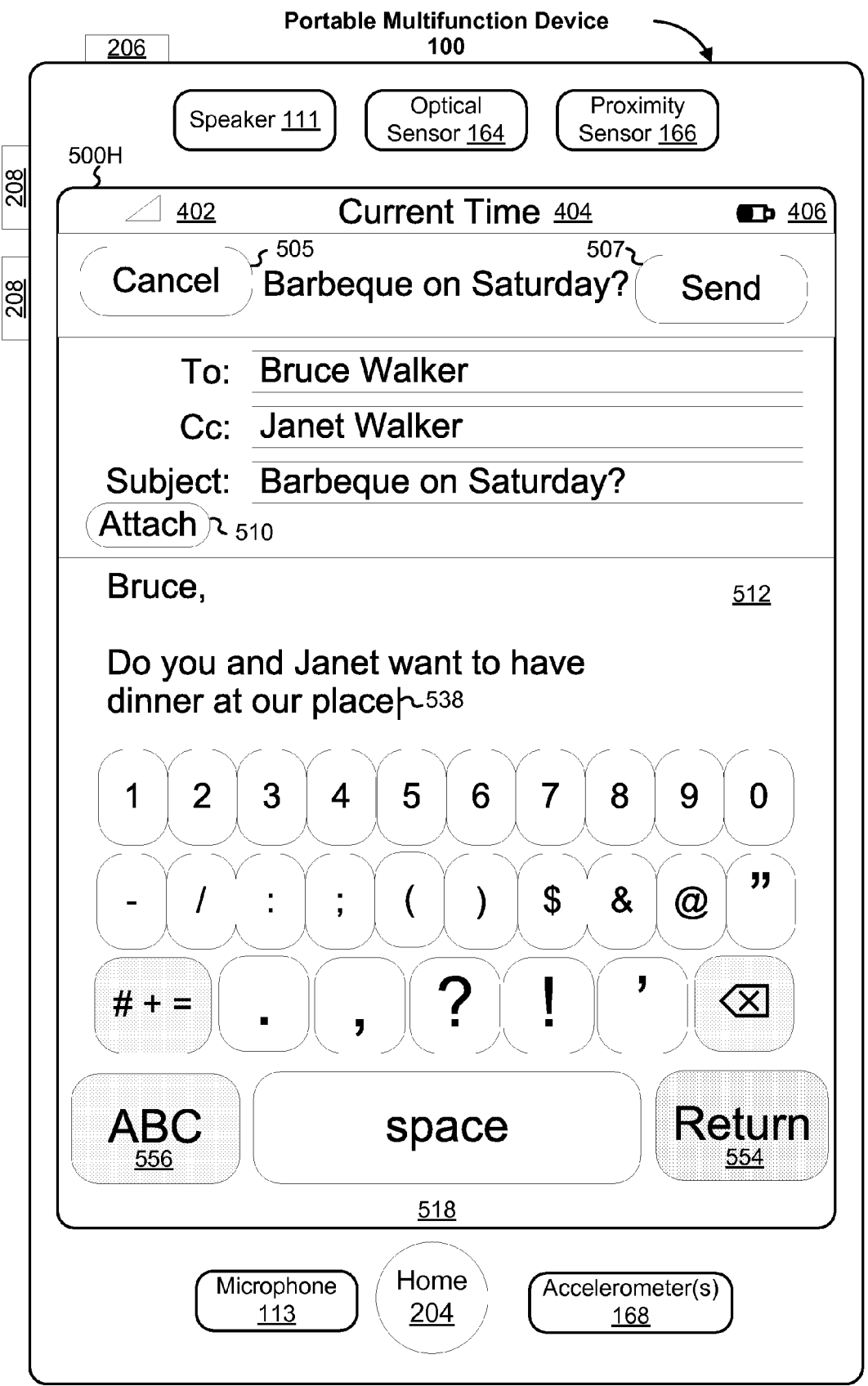
Figure 6B:
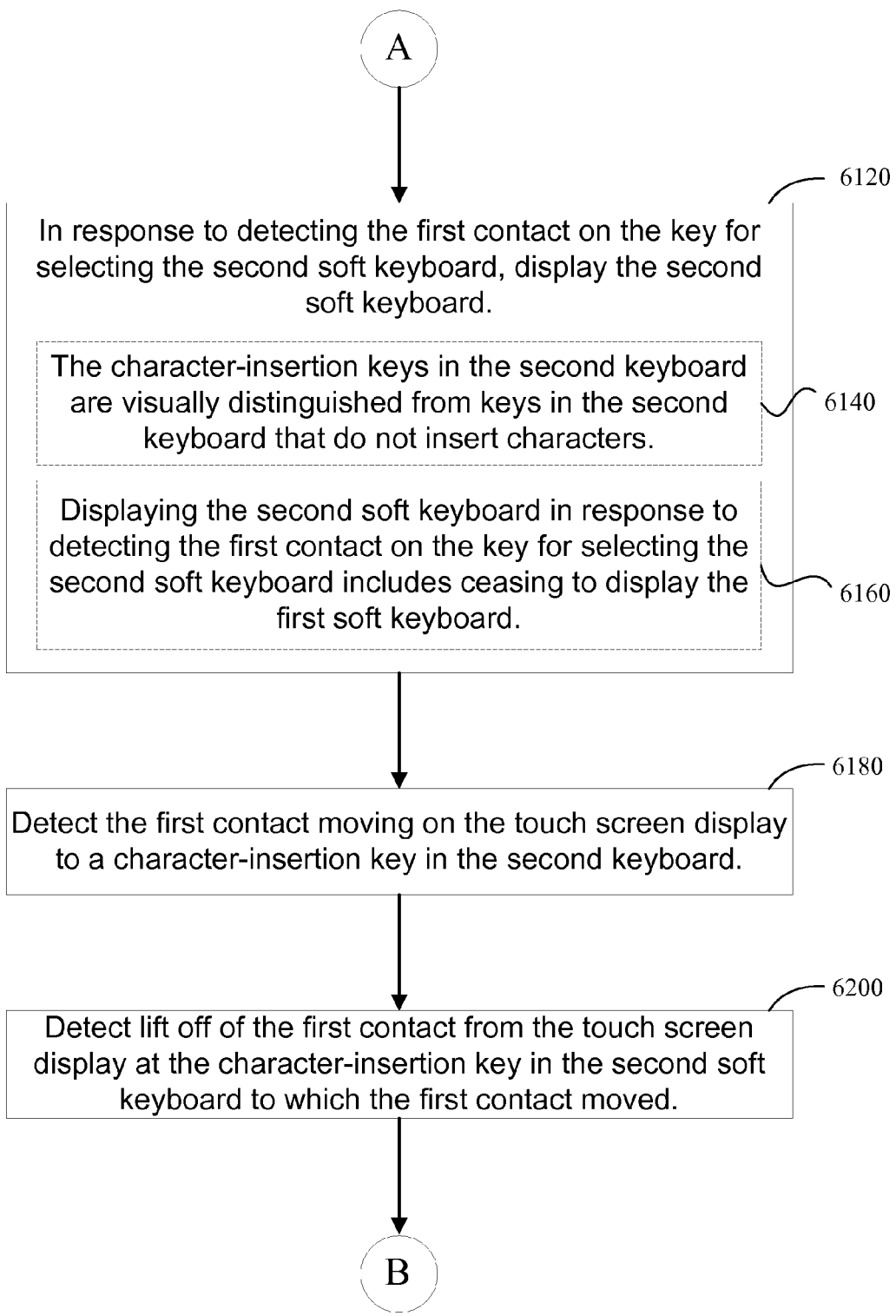
Figure 6C:
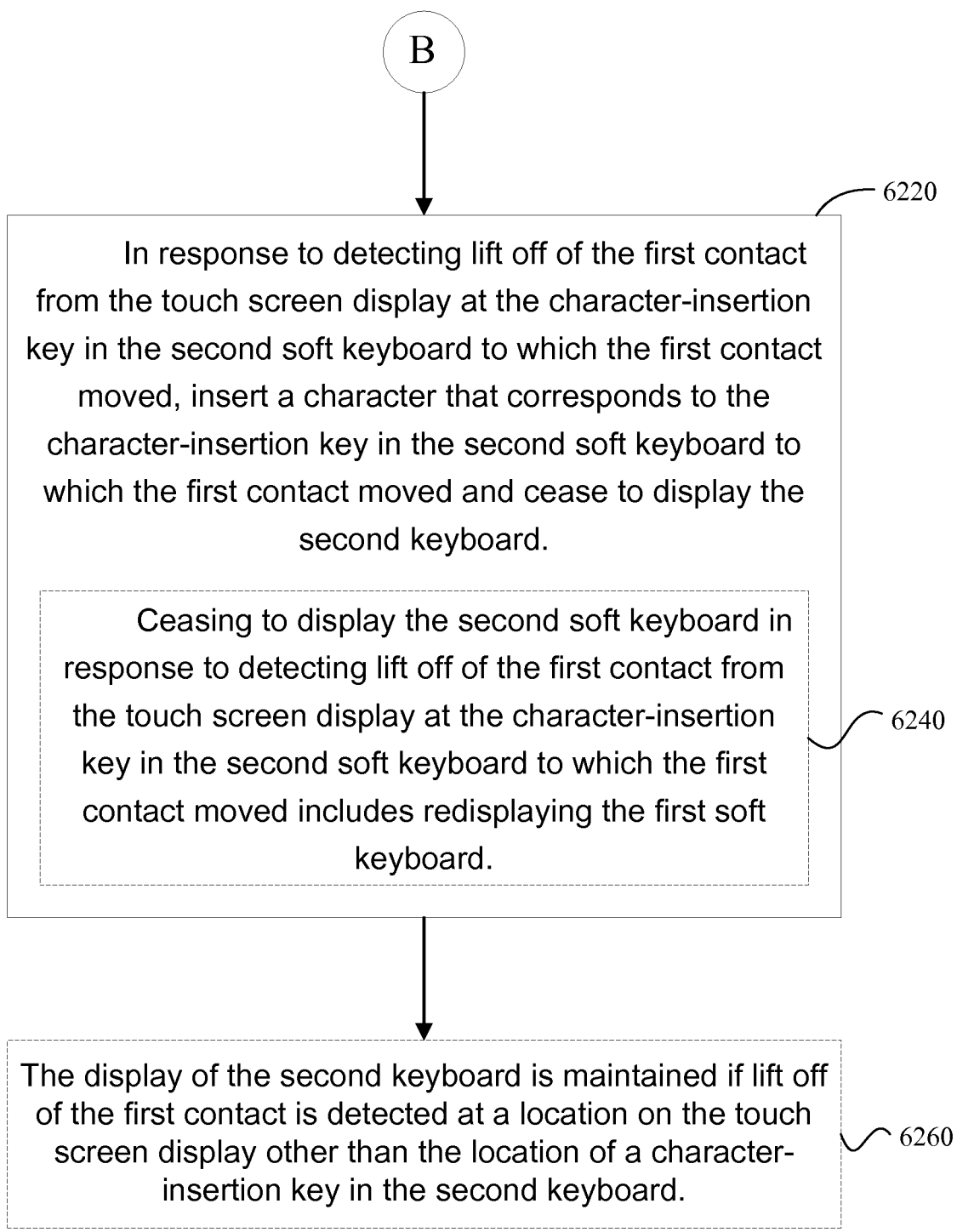

In response to detecting lift off of the first contact 560 from the touch screen display at the character-insertion key in the second soft keyboard to which the first contact moved, the device inserts (6220) a character that corresponds to the character-insertion key in the second soft keyboard to which the first contact moved (e.g., the device inserts the "?" character 574, FIG. 5F) and ceases to display the second soft keyboard (e.g., keyboard 518 is no longer displayed in FIG. 5F). For example, a character such as a letter, number, punctuation mark, a space, or other symbol may be inserted in a text input area (e.g., message box 512) on the touch screen display.

In some embodiments, ceasing to display the second soft keyboard 518 in response to detecting lift off of the first contact from the touch screen display at the character-insertion key in the second soft keyboard to which the first contact moved may also include the device redisplaying (6240) the first soft keyboard (e.g., 516, FIG. 5F).

In some embodiments, the display of the second keyboard 518 is maintained (6260) if lift off of the first contact 560 is detected at a location on the touch screen display other than the location of a character-insertion key in the second keyboard (e.g., as described above with respect to FIGS. 5G and 5H). For example, display of the second keyboard 518 is maintained if lift off is detected at a text input area, at a deletion key, at a return key, at a shift key, or at a key for selecting another soft keyboard.

A graphical user interface on a portable electronic device with a touch screen display includes: a first soft keyboard containing a plurality of character-insertion keys (e.g., keyboard 516, FIG. 5A); a key for selecting a second soft keyboard different from the first soft keyboard (e.g., key 552, FIG. 5A); and the second soft keyboard (e.g., keyboard 518, FIG. 5C), the second soft keyboard containing a plurality of character-insertion keys. The key 552 for selecting the second soft keyboard is displayed while displaying the first soft keyboard 516. In response to detecting a first contact on the key for selecting the second soft keyboard (e.g., contact 560-1, FIG. 5B), the second soft keyboard 518 is displayed (e.g., UI 500C, FIG. 5C). The first contact 560 is detected moving on the touch screen display (e.g., from 560-1 to 560-2, FIG. 5D) to a character-insertion key in the second soft keyboard (e.g., key 564, FIGS. 5D-5E). Lift off of the first contact (e.g., contact 560-2, FIG. 5D) from the touch screen display is detected at the character-insertion key in the second soft keyboard to which the first contact moved. In response to detecting lift off of the first contact from the touch screen display at the character-insertion key in the second soft keyboard to which the first contact moved, a character (e.g., character 574, FIG. 5F) is inserted that corresponds to the character-insertion key (e.g., key 564, FIG. 5E) in the second soft keyboard to which the first contact moved, and display of the second soft keyboard is ceased (e.g., UI 500F, FIG. 5F).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a portable electronic device with a touch screen display:
displaying a first soft keyboard and a text input area, the first soft keyboard containing a plurality of character-insertion keys;
while displaying the first soft keyboard, displaying a key for selecting a second soft keyboard different from the first soft keyboard, the second soft keyboard containing a plurality of character-insertion keys;
detecting a single contact on the key for selecting the second soft keyboard;
in response to detecting the single contact on the key for selecting the second soft keyboard, displaying the second soft keyboard;
while maintaining the single contact, detecting the single contact moving on the touch screen display without breaking contact with the touch screen display, to a character-insertion key in the second soft keyboard;
detecting lift off of the single contact from the touch screen display at the character-insertion key in the second soft keyboard to which the single contact moved; and in response to detecting lift off of the single contact from the touch screen display at the character-insertion key in the second soft keyboard to which the single contact moved:
inserting a character in the text input area that corresponds to the character-insertion key in the second soft keyboard to which the single contact moved;
ceasing to display the second soft keyboard; and
displaying the first soft keyboard.

2. The method of claim 1, wherein the single contact is a finger contact.

3. The method of claim 1, wherein the single contact is a stylus contact.

4. The method of claim 1, wherein
displaying the second soft keyboard in response to detecting the single contact on the key for selecting the second soft keyboard includes ceasing to display the first soft keyboard, and
ceasing to display the second soft keyboard in response to detecting lift off of the single contact from the touch screen display at the character-insertion key in the second soft keyboard to which the single contact moved includes redisplaying the first soft keyboard.

5. The method of claim 1, wherein display of the second keyboard is maintained if lift off of the single contact is detected at a location on the touch screen display other than the location of a character-insertion key in the second keyboard.

6. The method of claim 1, wherein character-insertion keys in the second keyboard are visually distinguished from keys in the second keyboard that do not insert characters.

7. The method of claim 1, wherein the key for selecting the second soft keyboard different from the first soft keyboard is a dedicated keyboard selection key.

8. The method of claim 1, including:
in response to detecting the single contact on the key for selecting the second soft keyboard, ceasing to display the first soft keyboard.

9. A graphical user interface on a portable electronic device with a touch screen display, a memory, and one or more processors to execute one or more programs in the memory, the graphical user interface comprising:
a first soft keyboard containing a plurality of character-insertion keys;
a text input area;
a key for selecting a second soft keyboard different from the first soft keyboard; and
the second soft keyboard, the second soft keyboard containing a plurality of character-insertion keys;
wherein:
the key for selecting the second soft keyboard is displayed while displaying the first soft keyboard;
in response to detecting a single contact on the key for selecting the second soft keyboard, the second soft keyboard is displayed;
the single contact, while being maintained, is detected moving on the touch screen display without breaking contact with the touch screen display to a character-insertion key in the second soft keyboard;
lift off of the single contact from the touch screen display is detected at the character-insertion key in the second soft keyboard to which the single contact moved; and
in response to detecting lift off of the single contact from the touch screen display at the character-insertion key in the second soft keyboard to which the single contact moved:

a character is inserted in the text input area that corresponds to the character-insertion key in the second soft keyboard to which the single contact moved;
display of the second soft keyboard is ceased; and
the first soft keyboard is displayed.

10. A portable electronic device, comprising:
a touch screen display;
one or more processors;
memory; and
one or more programs, wherein the one or more programs are stored in the memory and configured to be executed by the one or more processors, the programs including instructions for:
displaying a first soft keyboard and a text input area, the first soft keyboard containing a plurality of character-insertion keys;
while displaying the first soft keyboard, displaying a key for selecting a second soft keyboard different from the first soft keyboard, the second soft keyboard containing a plurality of character-insertion keys;
detecting a single contact on the key for selecting the second soft keyboard;
in response to detecting the single contact on the key for selecting the second soft keyboard, displaying the second soft keyboard;
while maintaining the single contact, detecting the single contact moving on the touch screen display without breaking contact with the touch screen display to a character-insertion key in the second soft keyboard;
detecting lift off of the single contact from the touch screen display at the character-insertion key in the second soft keyboard to which the single contact moved; and
in response to detecting lift off of the single contact from the touch screen display at the character-insertion key in the second soft keyboard to which the single contact moved:
inserting a character in the text input area that corresponds to the character-insertion key in the second soft keyboard to which the single contact moved;
ceasing to display the second soft keyboard; and
displaying the first soft keyboard.

11. The device of claim 10, wherein the single contact is a finger contact.

12. The device of claim 10, wherein the single contact is a stylus contact.

13. The device of claim 10, wherein displaying the second soft keyboard in response to detecting the single contact on the key for selecting the second soft keyboard includes ceasing to display the first soft keyboard, and
ceasing to display the second soft keyboard in response to detecting lift off of the single contact from the touch screen display at the character-insertion key in the second soft keyboard to which the single contact moved includes redisplaying the first soft keyboard.

14. The device of claim 10, wherein display of the second keyboard is maintained if lift off of the single contact is detected at a location on the touch screen display other than the location of a character-insertion key in the second keyboard.

15. The device of claim 10, wherein character-insertion keys in the second keyboard are visually distinguished from keys in the second keyboard that do not insert characters.

16. The device of claim 10, wherein the key for selecting the second soft keyboard different from the first soft keyboard is a dedicated keyboard selection key.

17. The device of claim 10, including instructions for:
in response to detecting the single contact on the key for selecting the second soft keyboard, ceasing to display the first soft keyboard.

18. A non-transitory computer readable storage medium having stored therein instructions, which when executed by a portable electronic device with a touch screen display, cause the device to:
display a first soft keyboard and a text input area, the first soft keyboard containing a plurality of character-insertion keys;
while displaying the first soft keyboard, display a key for selecting a second soft keyboard different from the first soft keyboard, the second soft keyboard containing a plurality of character-insertion keys;
detect a single contact on the key for selecting the second soft keyboard;
in response to detecting the single contact on the key for selecting the second soft keyboard, display the second soft keyboard;
while maintaining the single contact, detect the single contact moving on the touch screen display without breaking contact with the touch screen display to a character-insertion key in the second soft keyboard;
detect lift off of the single contact from the touch screen display at the character-insertion key in the second soft keyboard to which the single contact moved; and
in response to detecting lift off of the single contact from the touch screen display at the character-insertion key in the second soft keyboard to which the single contact moved:
insert a character in the text input area that corresponds to the character-insertion key in the second soft keyboard to which the single contact moved;
cease to display the second soft keyboard; and
display the first soft keyboard.

19. The computer readable storage medium of claim 18, wherein the single contact is a finger contact.

20. The computer readable storage medium of claim 18, wherein the single contact is a stylus contact.

21. The computer readable storage medium of claim 18, wherein displaying the second soft keyboard in response to detecting the single contact on the key for selecting the second soft keyboard includes ceasing to display the first soft keyboard, and
ceasing to display the second soft keyboard in response to detecting lift off of the single contact from the touch screen display at the character-insertion key in the second soft keyboard to which the single contact moved includes redisplaying the first soft keyboard.

22. The computer readable storage medium of claim 18, wherein display of the second keyboard is maintained if lift off of the single contact is detected at a location on the touch screen display other than the location of a character-insertion key in the second keyboard.

23. The computer readable storage medium of claim 18, wherein character-insertion keys in the second keyboard are visually distinguished from keys in the second keyboard that do not insert characters.

24. The computer readable storage medium of claim 18, wherein the key for selecting the second soft keyboard different from the first soft keyboard is a dedicated keyboard selection key.

25. The computer readable storage medium of claim 18, including instructions which cause the device to:

in response to detecting the single contact on the key for selecting the second soft keyboard, cease to display the first soft keyboard.

* * * * *